(12) United States Patent
Hatanaka (10) Patent No.: US 11,673,273 B2
(45) Date of Patent: Jun. 13, 2023

(54) OFF-LINE PROGRAMMING APPARATUS, ROBOT CONTROLLER, AND AUGMENTED REALITY SYSTEM

(71) Applicant: FANUC CORPORATION, Yamanashi (JP)

(72) Inventor: Kokoro Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 16/864,320

(22) Filed: May 1, 2020

(65) Prior Publication Data
US 2020/0384647 A1 Dec. 10, 2020

(30) Foreign Application Priority Data
Jun. 7, 2019 (JP) .............................. JP2019-106910

(51) Int. Cl.
  *B25J 9/16* (2006.01)
(52) U.S. Cl.
  CPC ........... *B25J 9/1671* (2013.01); *B25J 9/1661* (2013.01); *B25J 9/1664* (2013.01); *B25J 9/1697* (2013.01)
(58) Field of Classification Search
  CPC ...... B25J 9/1671; B25J 9/1661; B25J 9/1664; B25J 9/1697; B25J 9/1605; B25J 9/161;
(Continued)

(56) References Cited

U.S. PATENT DOCUMENTS

| | | | | |
|---|---|---|---|---|
| 5,915,073 | A | * | 6/1999 | Maeda .................... B25J 9/1605 700/245 |
| 2014/0236565 | A1 | * | 8/2014 | Kuwahara .............. B25J 9/1671 703/22 |

(Continued)

FOREIGN PATENT DOCUMENTS

| | | |
|---|---|---|
| JP | H0581384 A | 4/1993 |
| JP | 2003-300185 A | 10/2003 |

(Continued)

OTHER PUBLICATIONS

S. M. Abbas, S. Hassan and J. Yun, "Augmented reality based teaching pendant for industrial robot," 2012 12th International Conference on Control, Automation and Systems, 2012, pp. 2210-2213. (Year: 2012).*

(Continued)

*Primary Examiner* — Nicholas Kiswanto
*Assistant Examiner* — Dylan Brandon Mooney
(74) *Attorney, Agent, or Firm* — Maier & Maier, PLLC (57) ABSTRACT

An off-line programming apparatus includes a model creation unit that creates three-dimensional models of a robot and a load, a storage unit that stores a dynamic parameter of the load, a graphic creation unit that creates a three-dimensional graphic representing the dynamic parameter based on the dynamic parameter, and a display unit that displays the three-dimensional models of the robot and the load and the three-dimensional graphic. The dynamic parameter includes inertia around three axes that are orthogonal to one another at a centroid of the load. The three-dimensional graphic is a solid defined by dimensions in three directions orthogonal to one another. The graphic creation unit sets a ratio of the dimensions in the three directions of the three-dimensional graphic to a ratio corresponding to a ratio of the inertia around the three axes.

11 Claims, 5 Drawing Sheets

(58) Field of Classification Search
CPC .......... B25J 13/00; G05B 2219/32014; G05B 2219/39449; G05B 2219/39451; G05B 19/423; G05B 2219/40515; G06T 2219/004; G06T 19/006
See application file for complete search history.

(56) References Cited

U.S. PATENT DOCUMENTS

| | | | |
|---|---|---|---|
| 2015/0151431 A1* | 6/2015 | Suyama | B25J 9/1605 901/5 |
| 2016/0158937 A1* | 6/2016 | Kamoi | B25J 9/1605 901/5 |
| 2017/0165841 A1* | 6/2017 | Kamoi | H04N 7/183 |
| 2018/0017461 A1* | 1/2018 | Arai | G01M 1/122 |
| 2018/0083562 A1 | 3/2018 | Bade et al. | |
| 2018/0281172 A1 | 10/2018 | Inaba et al. | |
| 2019/0202055 A1* | 7/2019 | Wang | B25J 9/1671 |
| 2021/0268656 A1* | 9/2021 | Marten | B25J 9/1633 |

FOREIGN PATENT DOCUMENTS

| | | | | |
|---|---|---|---|---|
| JP | 2016107379 A | 6/2016 | | |
| JP | 2017-056525 A | 3/2017 | | |
| JP | 2018-008326 A | 1/2018 | | |
| JP | 2018065232 A | 4/2018 | | |
| JP | 2018-171682 A | 11/2018 | | |
| JP | 2019193975 A | * | 11/2019 | ............ B25J 9/0087 |
| KR | 101850410 B1 | * | 4/2018 | ............. B25J 9/163 |
| WO | 2003/084720 A1 | 10/2003 | | |

OTHER PUBLICATIONS

Y. Su, C. Chen, S. Cheng, C. Ko and K. Young, "Development of a 3D AR-Based Interface for Industrial Robot Manipulators," 2018 IEEE International Conference on Systems, Man, and Cybernetics (SMC), 2018, pp. 1809-1814, doi: 10.1109/SMC.2018.00313. (Year: 2018).*

C. Mateo, A. Brunete, E. Gambao and M. Hernando, "Hammer: An Android based application for end-user industrial robot programming," 2014 IEEE/ASME 10th International Conference on Mechatronic and Embedded Systems and Applications (MESA), 2014, pp. 1-6, doi: 10.1109/MESA.2014.6935597. (Year: 2014).*

Y. H. Su, Y. Q. Xu, S. L. Cheng, C. H. Ko and K. Y. Young, "Development of an Effective 3D VR-Based Manipulation System for Industrial Robot Manipulators," 2019 12th Asian Control Conference (ASCC), Kitakyushu, Japan, 2019, pp. 1-6. (Year: 2019).*

* cited by examiner

OFF-LINE PROGRAMMING APPARATUS, ROBOT CONTROLLER, AND AUGMENTED REALITY SYSTEM

CROSS-REFERENCE TO RELATED APPLICATION

This application claims the benefit of Japanese Patent Application No. 2019-106910, the content of which is incorporated herein by reference.

FIELD

The present invention relates to an off-line programming apparatus, a robot controller, and an augmented reality system.

BACKGROUND

In recent years, in control of an industrial robot, importance of appropriate control such as feedforward control has been increased to meet demands for high-speed robot motion and high locus accuracy (for example, Japanese Unexamined Patent Application, Publication No. 2017-056525). To appropriately control the robot, it is important to set an appropriate value of the dynamic parameters of each of the robot and a load connected to the robot. The load is, for example, an end effector such as a tool and a hand. The dynamic parameters include, for example, mass, centroid positions, and inertia around the centroids of the robot and the load.

On the other hand, a robot simulation apparatus that displays a centroid position or a motion state of a robot on a display is well known (for example, Japanese Unexamined Patent Application, Publication No. 2018-008326 and Japanese Unexamined Patent Application, Publication No. 2003-300185).

SUMMARY

According to an aspect of the present disclosure, an off-line programming apparatus that creates a motion program of a robot off line, includes: a model creation unit that creates a three-dimensional model of the robot and a three-dimensional model of a load connected to a front end of a robot arm of the robot; a storage unit that stores a dynamic parameter of the load; a graphic creation unit that creates a three-dimensional graphic representing the dynamic parameter based on the dynamic parameter stored in the storage unit; and a display unit that displays the three-dimensional models of the robot and the load, and the three-dimensional graphic. The dynamic parameter includes inertia around three axes that are orthogonal to one another at a centroid of the load. The three-dimensional graphic is a solid defined by dimensions in three directions orthogonal to one another. The graphic creation unit sets a ratio of the dimensions in the three directions of the three-dimensional graphic to a ratio corresponding to a ratio of the inertia around the three axes.

DETAILED DESCRIPTION OF EMBODIMENTS

An off-line programming apparatus 10 according to an embodiment of the present disclosure is described below with reference to drawings.

Figure 1:
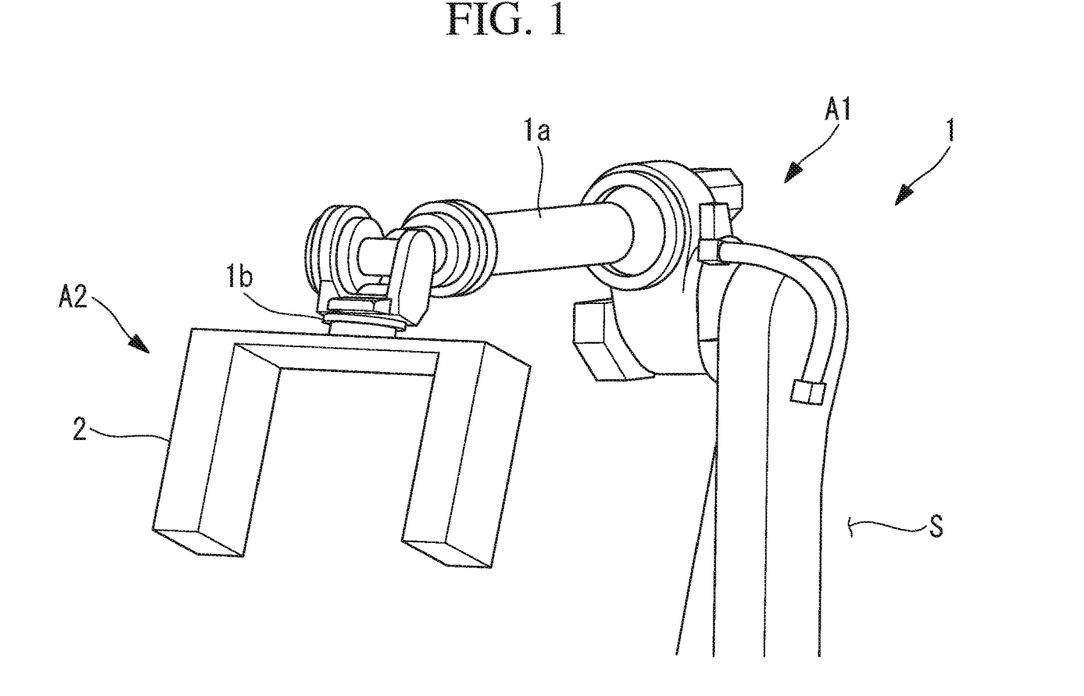
FIG. 1 is a diagram illustrating exemplary three-dimensional models of a robot and a load.
Figure 2:
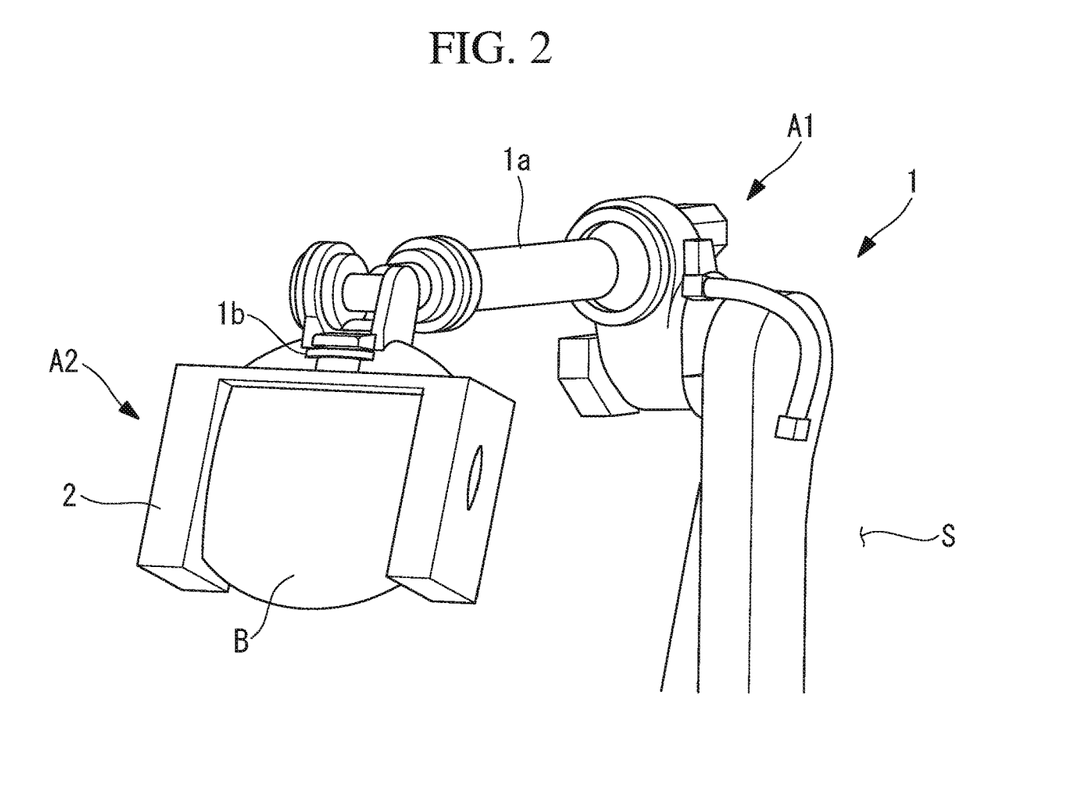
FIG. 2 is a diagram illustrating an example in which a three-dimensional graphic representing the dynamic parameter of the load is synthesized with the three-dimensional models

As illustrated in FIG. 1, the off-line programming apparatus 10 displays a virtual space S where a three-dimensional model A1 of a robot 1 and a three-dimensional model A2 of a load 2 are disposed, and creates a motion program of the robot 1 off line based on an motion path specified in the virtual space S by a user. As illustrated in FIG. 2, the off-line programming apparatus 10 further displays a three-dimensional graphic B representing a dynamic parameter of the load 2 together with the three-dimensional models A1 and A2.

The robot 1 is an industrial robot including a robot arm 1a. In FIG. 1 and FIG. 2, a six-axis vertical articulated robot is illustrated as an example of the robot 1. The robot 1 may be an industrial robot of the other type such as a horizontal articulated robot and a parallel link robot. The load 2 is an object connected to a wrist flange 1b at a front end of the robot arm 1a, and is an end effector such as a tool and a hand.

Figure 3:
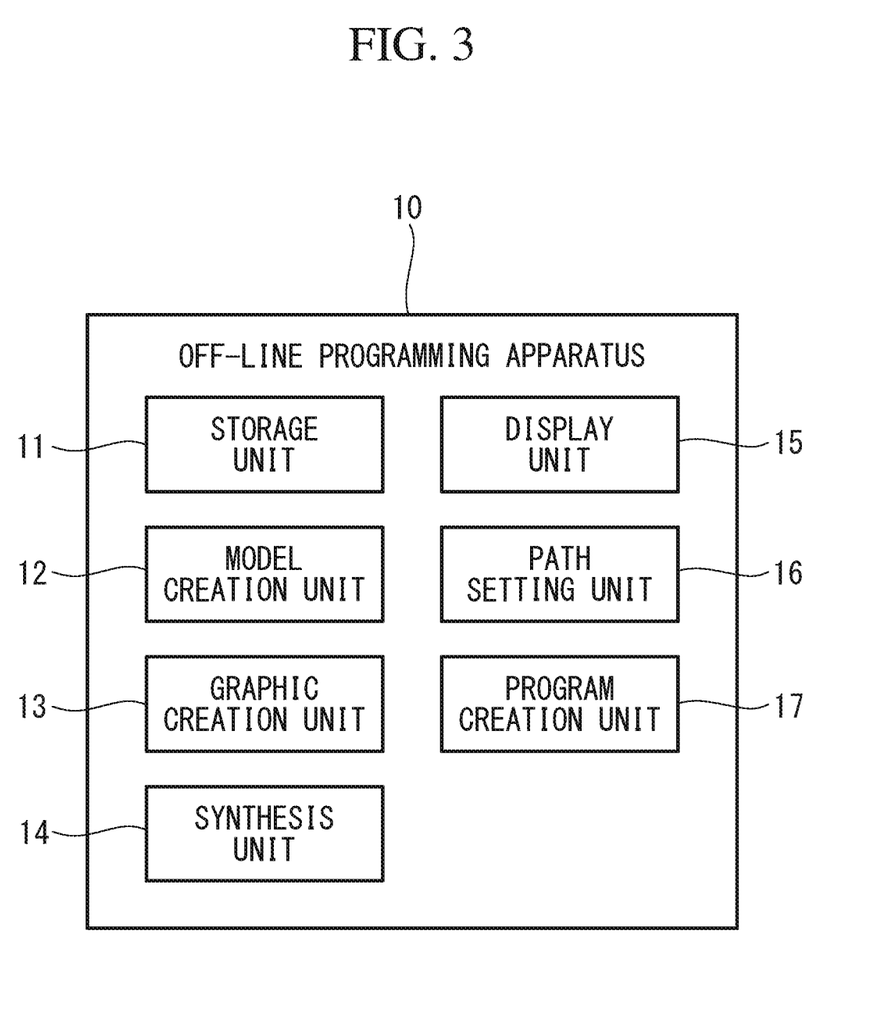
FIG. 3 is a block diagram of an off-line programming apparatus according to an embodiment.

As illustrated in FIG. 3, the off-line programming apparatus 10 includes a storage unit 11, a model creation unit 12, a graphic creation unit 13, a synthesis unit 14, a display unit 15, a path setting unit 16, and a program creation unit 17.

The off-line programming apparatus 10 is realized by a computer such as a personal computer. The computer includes a processor like a central processing unit, a main storage device including a RAM, a ROM, and the like, an auxiliary storage device including an HDD and the like, a display, and an input device such as a mouse, a keyboard, and a touch panel. The auxiliary storage device stores a motion program creation program. The functions described below of the respective units 12, 13, 14, 16, and 17 are realized when the processor performs processing according to the motion program creation program.

The storage unit 11 includes, for example, an auxiliary storage device. The storage unit 11 stores three-dimensional shape data of the robot 1, three-dimensional shape data of the load 2, and virtual space data. The storage unit 11 may include a plurality of pieces of three-dimensional shape data of the load 2. Each of the three-dimensional shape data and the virtual space data is, for example, three-dimensional CAD data.

The storage unit 11 further stores a value of the dynamic parameter of the load 2. The dynamic parameter includes mass M, a centroid position, and three inertia Ix, Iy, and Iz around the centroid of the load 2. The inertia Ix, Iy, and Iz are inertia around an Xi axis, a Yi axis, and a Zi axis, respectively, that are orthogonal to one another at the centroid of the load 2. The Xi axis, the Yi axis, and the Zi axis are axes in a load coordinate system fixed to the load 2. The value of the dynamic parameter is input and set to the off-line programming apparatus by the user through, for example, the input device.

The model creation unit 12 reads out the three-dimensional shape data of the robot 1 from the storage unit 11, and creates the three-dimensional model A1 of the robot 1 from the three-dimensional shape data. Further, the model creation unit 12 reads out one piece of three-dimensional shape data of the load 2 from the storage unit 11, and creates the three-dimensional model A2 of the load 2 from the three-dimensional shape data. Thereafter, the model creation unit 12 connects the three-dimensional model A2 of the load 2 to the wrist flange 1b of the three-dimensional model A1 of the robot 1.

Figure 4:
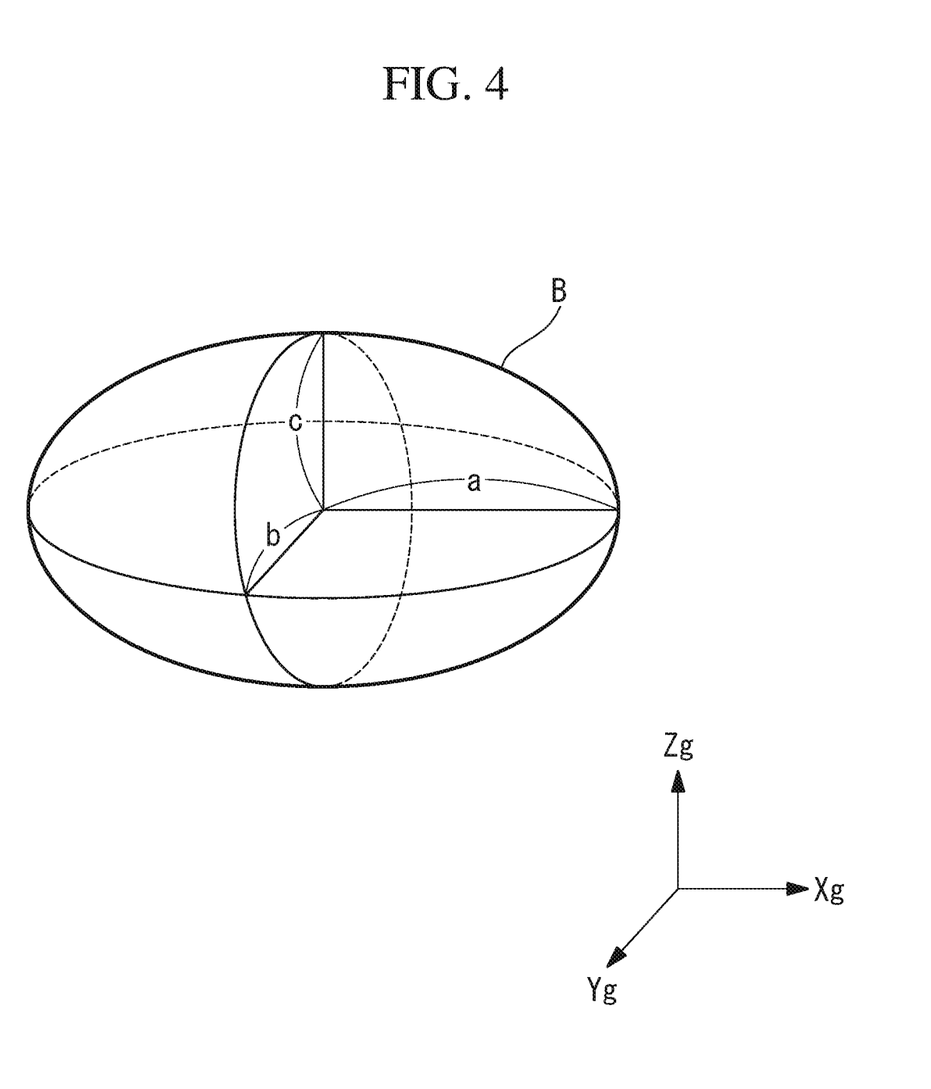
FIG. 4 is a diagram to explain the three-dimensional graphic.

As illustrated in FIG. 4, the three-dimensional graphic B is an ellipsoid. The ellipsoid is defined by diameters 2×a, 2×b, and 2×c in three directions orthogonal to one another. The graphic creation unit 13 sets a basic size of the ellipsoid based on the mass M, and sets a ratio of the diameters 2×a, 2×b, and 2×c to a ratio corresponding to a ratio of the inertia Ix, Iy, and Iz. For example, the graphic creation unit 13 creates a sphere having a diameter corresponding to the mass M, and then reduces or enlarges each of the diameters in the three directions of the sphere based on the radio of the inertia Ix, Iy, and Iz, thereby creating the ellipsoid. A specific example of the method of creating the three-dimensional graphic B is described below.

The synthesis unit 14 synthesizes the three-dimensional graphic B with the three-dimensional model A1 of the robot 1 and the three-dimensional model A2 of the load 2 such that a center position of the three-dimensional graphic B is coincident with the centroid position of the load 2. Further, the synthesis unit 14 reads out the virtual space data from the storage unit 11, and creates the three-dimensional virtual space S from the virtual space data. The virtual space S is a space including a motion range of the robot 1. Thereafter, the synthesis unit 14 disposes the three-dimensional models A1 and A2 synthesized with the three-dimensional graphic B in the virtual space S, and displays the virtual space S together with the three-dimensional models A1 and A2 and the three-dimensional graphic B on the display unit 15. The display unit 15 is, for example, a display of the computer.

The synthesis unit 14 may synthesize the three-dimensional graphic B with the three-dimensional models such that the directions of the three axes Xg, Yg, and Zg of the three-dimensional graphic B are coincident with the directions of the three axes of the wrist coordinate system; however, the axes Xg, Yg, and Zg of the three-dimensional graphic B may not necessarily be coincident with the three axes of the wrist coordinate system. The wrist coordinate system is a three-dimensional orthogonal coordinate system fixed to the wrist flange 1b. For example, the synthesis unit 14 may adjust an attitude in the coordinate system of the three-dimensional graphic B to the wrist coordinate system such that products of inertia in the coordinate system of the three-dimensional graphic B become zero.

The path setting unit 16 sets the motion path of the robot 1 based on one or more points or one or more lines designated in the virtual space S by the user. For example, the user designates one or more teaching points and its order in the virtual space S displayed on the display unit 15, by using the input device. The path setting unit 16 sets a path that passes through the one or more teaching points in the designated order, as the motion path.

The program creation unit 17 creates a motion program to control the robot 1 based on the set motion path. For example, the program creation unit 17 creates the motion program so as to move the load 2 along the motion path. The created motion program is stored in the storage unit 11.

Next, an operation of the off-line programming apparatus 10 is described.

First, the value of the dynamic parameter of the load 2 is set to the off-line programming apparatus 10 by the user, and is stored in the storage unit 11. Next, the three-dimensional model A1 of the robot 1 to which the three-dimensional model A2 of the load 2 is connected is created by the model creation unit 12, and the three-dimensional graphic B representing the value of the dynamic parameter of the load 2 is created by the graphic creation unit 13.

Next, the three-dimensional graphic B is synthesized with the three-dimensional models A1 and A2 by the synthesis unit such that the center position of the three-dimensional graphic B is coincident with the centroid position of the three-dimensional model A2 of the load 2, and the three-dimensional graphic B and the three-dimensional models A1 and A2 are disposed in the three-dimensional virtual space S. Thereafter, the virtual space S including the three-dimensional models A1 and A2 and the three-dimensional graphic B is displayed on the display unit 15.

The user designates the points or the lines representing the motion path in the virtual space S displayed on the display unit 15, by using the input device. The motion path is set by the path setting unit 16 based on the points or the lines designated by the user.

Next, the motion program based on the set motion path is created by the program creation unit 17.

As described above, according to the present embodiment, the three-dimensional graphic B that visualizes the value of the dynamic parameter of the load 2 set by the user is displayed on the display unit 15. This enables the user to visually confirm whether the set value of the dynamic parameter is appropriate, based on the three-dimensional graphic B.

More specifically, a size of the entire three-dimensional graphic B roughly represents the mass of the load 2. The center position of the three-dimensional graphic B represents the centroid position of the load 2. The ratio of the diameters 2×a, 2×b, and 2×c of the three-dimensional graphic B in the three directions represents relative sizes of the inertia Ix, Iy, and Iz. Accordingly, the user can intuitively judge whether the set values of the mass M and the centroid position of the load 2 are appropriate by comparing the three-dimensional graphic B and the three-dimensional model A2 of the load 2 displayed on the display unit 15. Further, the user can intuitively judge whether the set values of the inertia Ix, Iy, and Iz are appropriate, from the dimensions of the three-dimensional graphic B in the three directions displayed on the display unit 15.

Next, an example of the method of creating the three-dimensional graphic B by the graphic creation unit 13 is described.

As illustrated in FIG. 4, the three-dimensional graphic B is an ellipsoid. First, a radius r of the sphere is determined from the following expression. A diameter 2×r of the sphere corresponds to a basic size of the ellipsoid. The diameter of each of the sphere and the ellipsoid is increased as the mass M of the load 2 is increased.

$$r = (3M/4\pi\rho)^{1/3}$$

In the expression, ρ is density of the load 2. The density ρ is set by the user, and is stored in the storage unit 11. For example, in a case where an iron tool is often used as the load 2, the density ρ is $7.8 \times 10^3$ [Kg/m$^3$] that is density of iron.

Next, the radiuses a, b, and c of the ellipsoid are calculated based on the values of the inertia Ix, Iy, and Iz around the Xi axis, the Yi axis, and the Zi axis of the load 2.

To calculate the radiuses a, b, and c, values na2, nb2, and nc2 that are respectively proportional to squares of the radiuses a, b, and c are first calculated.

$$na2=Iy+Iz-Ix$$

$$nb2=Iz+Ix-Iy$$

$$nc2=Ix+Iy-Iz$$

In a case where any of the values na2, nb2, and nc2 is lower than zero, the value lower than zero is corrected to zero. For example, in a case where the value na2 is lower than zero, the value na2 is corrected to zero.

Note that the following formulae to determine the inertia Ix, Iy, and Iz of the ellipsoid that has the diameters 2×a, 2×b, and 2×c and the mass M are commonly known.

$$Ix=(b^2+c^2)M/5$$

$$Iy=(c^2+a^2)M/5$$

$$Iz=(a^2+b^2)M/5$$

The above-described relational expressions of the values na2, nb2, and nc2 and the inertia Ix, Iy, and Iz are derived by deforming the formulae.

Next, values na, nb, nc, and nmax are determined from the values na1, nb2, and nc2.

$$na=(na2)^{1/2}$$

$$nb=(nb2)^{1/2}$$

$$nc=(nc2)^{1/2}$$

$$nmax=\max\{na,nb,nc\}$$

In a case where the value nmax is zero, the values nmax, na, nb, and nc are all corrected to one. In a case where any of the values na, nb, and nc is lower than 0.1×nmax, the value lower than 0.1×nmax may be corrected to 0.1×nmax. For example, in a case where the value na is lower than 0.1×nmax, the value na may be corrected to 0.1×nmax.

Next, values N, Na, Nb, and Nc are determined from the values na, nb, and nc.

$$N=(na \cdot nb \cdot nc)^{1/3}$$

$$Na=na/N$$

$$Nb=nb/N$$

$$Nc=nc/N$$

Next, the radiuses a, b, and c of the ellipsoid are determined from the values Na, Nb, Nc, and r.

$$a=Na \cdot r$$

$$b=Nb \cdot r$$

$$c=Nc \cdot r$$

Examples of the dynamic parameter of the load 2 and the three-dimensional graphic B in FIG. 1 and FIG. 2 are described below.

Mass M=207[Kg]

Centroid position $(X,Y,Z)=(0,0,0.211)$[m]

Inertia $(Ix,Iy,Iz)=(35.6,14.6,22.5)$[Kgm$^2$]

Note that, in this example, the products of inertia in the wrist coordinate system are zero.

In the above-described dynamic parameter, the density ρ of the load 2 is 7.8×10$^3$ [Kg/m$^3$]; however, the density ρ of 5.0×10$^3$ [Kg/m$^3$] is used in creation of the three-dimensional graphic B in order to display the three-dimensional graphic B in a slightly larger size for viewing easiness. The calculation is performed based on the above-described expressions to determine the following values.

$(a,b,c)=(0.0732,0.411,0.328)$[m]

As described above, a value larger than or smaller than the density ρ of the load 2 may be used. For example, the value of the density ρ of the load 2 used in creation of the three-dimensional graphic B may be changeable by the user.

The dimensions of the three-dimensional graphic B displayed on the display 15 are varied depending on the density ρ in addition to the mass M. For example, to largely display the three-dimensional graphic B on the display 15, the user may set a value smaller than the actual density ρ of the load 2. For example, in a case where the load 2 is made of iron, the density ρ may be set to 5.0×10$^3$.

In the above-described embodiment, the three-dimensional graphic B representing the value of the dynamic parameter of the load 2 is displayed on the display unit 15 of the off-line programming apparatus 10; however, the display of the three-dimensional graphic B may be applied to the other optional system that displays the three-dimensional model of the robot 1 or the real robot 1.

Figure 5:
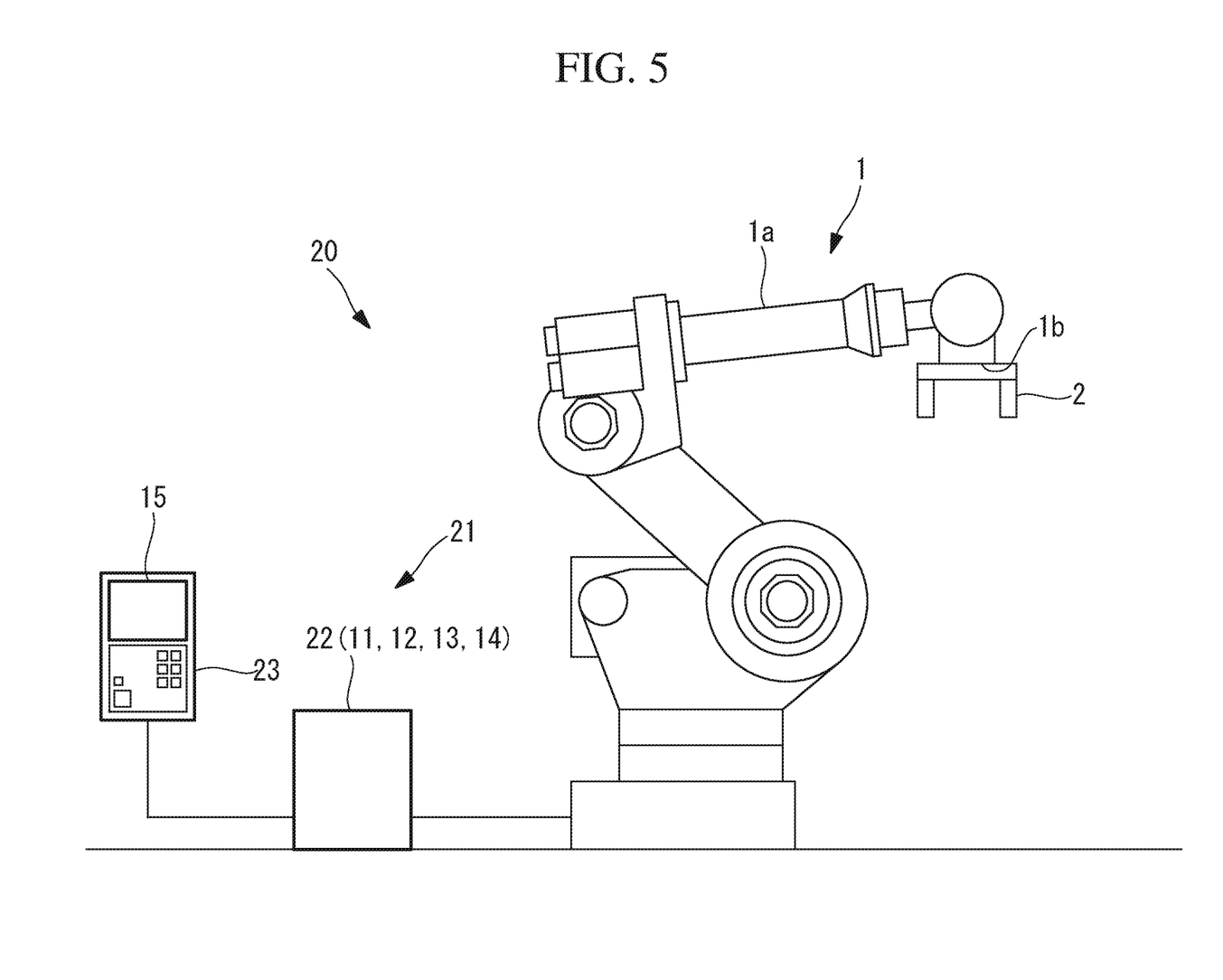
FIG. 5 is an entire configuration diagram of a robot system according to another embodiment.

FIG. 5 illustrates an example of a robot system 20 according to another embodiment of the present disclosure. The robot system 20 includes the robot 1 and a robot controller 21 that controls the robot 1. The robot controller 21 includes a controller body 22 and a teach pendant 23 that is operated by the user to teach motion to the robot 1. The controller body 22 is connected to the robot 1 and the teach pendant 23.

The robot controller 21 includes the storage unit 11, the model creation unit 12, the graphic creation unit 13, the synthesis unit 14, and the display unit 15 described above. For example, the storage unit 11 includes a storage device incorporated in the controller body 22, and the model creation unit 12, the graphic creation unit 13, and the synthesis unit 14 are realized by a processor incorporated in the controller body 22. The teach pendant 23 includes the display unit 15, and the virtual space S where the three-dimensional models A1 and A2 and the three-dimensional graphic B are disposed is displayed on the display unit 15. The three-dimensional graphic B may be synthesized with the three-dimensional models A1 and A2 such that the center position of the three-dimensional graphic B is coincident with the centroid position of the three-dimensional model A2 of the load 2.

Figure 6:
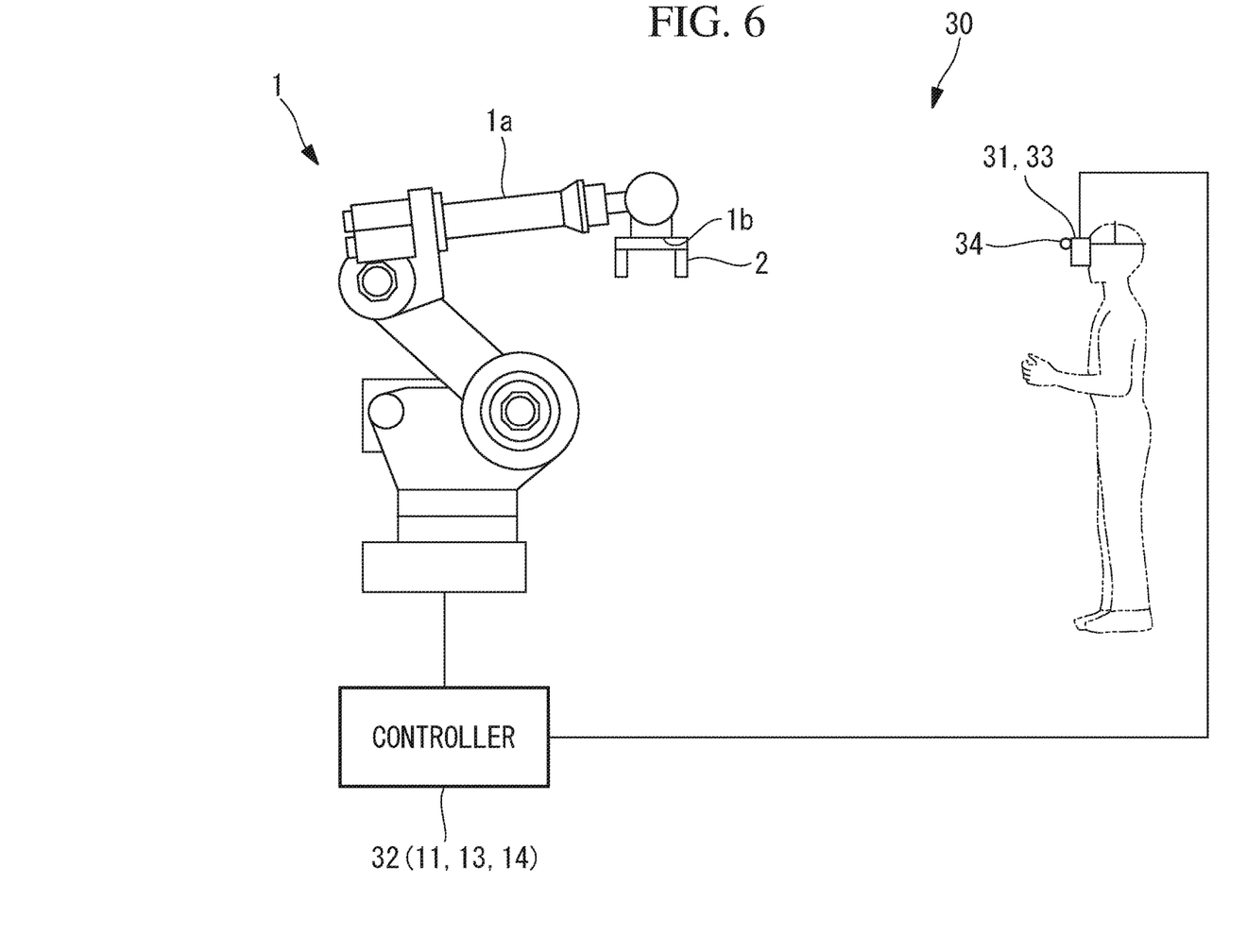
FIG. 6 is an entire configuration diagram of an augmented reality system according to still another embodiment.

FIG. 6 illustrates an example of an augmented reality (AR) system 30 according to still another embodiment of the disclosure. The AR system 30 provides augmented reality including the real robot 1 to the user. More specifically, the AR system 30 includes the robot 1, a head mounted display (HMD) apparatus 31 mounted on a head of the user, and a controller 32 connected to the robot 1 and the HMD apparatus 31.

The HMD apparatus 31 includes a display (display unit) 33 and a camera 34. The display 33 is disposed in front of eyes of the user and displays the augmented reality including the real robot 1 and the three-dimensional graphic B. The camera 34 acquires an image of the robot 1. The camera 34 may be fixed to an optional position around the robot 1.

The controller 32 includes the storage unit 11, the graphic creation unit 13, and the synthesis unit 14 described above.

For example, the storage unit 11 includes a storage device incorporated in the controller 32, and the graphic creation unit 13 and the synthesis unit 14 are realized by a processor incorporated in the controller 32. In the present embodiment, the synthesis unit 14 synthesizes the three-dimensional graphic B with the image acquired by the camera 34. Preferably, the synthesis unit 14 synthesizes the three-dimensional graphic B with the image such that the center position of the three-dimensional graphic B is coincident with the centroid position of the load 2 in the image. The image of the real robot 1 synthesized with the three-dimensional graphic B is displayed as the augmented reality on the display 33.

The display 33 may be a transparent display that allows light to pass therethrough. The user can view the real robot 1 through the transparent display 33. In other words, in this case, the display 33 displays the augmented reality including a see-through image of the real robot 1 and the three-dimensional graphic B.

Further, the display 33 may be of an optional type disposed at an optional position in place of the display of the HMD apparatus 31. For example, in place of the HMD apparatus 31, the AR system 30 may include a tablet computer that includes the display 33 and is carried by the user.

In each of the above-described embodiments, the three-dimensional graphic B is the ellipsoid. Alternatively, the three-dimensional graphic B may be other solid. More specifically, the three-dimensional graphic B may be an optional solid as long as the solid is uniquely defined by dimensions in three directions orthogonal to one another. For example, the three-dimensional graphic B may be a rectangular parallelepiped or an elliptical column.

In each of the above-described embodiments, the graphic creation unit 13 sets the dimensions of the three-dimensional graphic B based on the mass M of the load 2. Alternatively, the graphic creation unit 13 may set the dimensions of the three-dimensional graphic B irrespective of the mass M of the load 2. For example, the diameter 2×r of a sphere that is the basic size of the three-dimensional graphic B may be set to a dimension desired by the user.

In each of the above-described embodiments, the synthesis unit 14 synthesizes the three-dimensional graphic B such that the center position of the three-dimensional graphic B is coincident with the centroid position of the load 2. Alternatively, the synthesis unit 14 may synthesize the three-dimensional graphic B at an optional position in the virtual space S or in the augmented reality.

The invention claimed is:

1. An off-line programming apparatus that creates a motion program of a robot comprising:
   a display; and
   a processor that is configured to:
      cause the display to display a three-dimensional model of the robot and a three-dimensional model of a load connected to a robot arm of the robot;
      define a solid having three radii extending in directions of three axes that are orthogonal to one another;
      determine a ratio of the three radii that corresponds to a ratio of values of inertia around the three axes at a centroid of the load to define an ellipsoid having diameters in three directions orthogonal to one another; and
      cause the display to display the defined ellipsoid.

2. The off-line programming apparatus according to claim 1, wherein the processor is further configured to cause the display to display the defined ellipsoid so that a center position of the defined ellipsoid coincides with a position corresponding to the centroid of the load in the three-dimensional model of the load.

3. The off-line programming apparatus according to claim 1, wherein the processor is further configured to define the solid by setting the three radii based on a mass of the load.

4. A robot controller that controls a robot, comprising:
   a teach pendant that includes a display and that is operated by a user to teach motion to the robot; and
   a processor that is configured to:
      cause the display to display a three-dimensional model of the robot and a three-dimensional model of a load connected to a robot arm of the robot;
      define a solid having three radii extending in directions of three axes that are orthogonal to one another;
      determine a ratio of the three radii that corresponds to a ratio of values of inertia around the three axes at a centroid of the load to define an ellipsoid having diameters in three directions orthogonal to one another; and
      cause the display to display the defined ellipsoid.

5. The robot controller according to claim 4, wherein the processor is further configured to cause the display to display the defined ellipsoid so that a center position of the defined ellipsoid coincides with a position corresponding to the centroid of the load in the three-dimensional model of the load.

6. The robot controller according to claim 4, wherein the processor is further configured to define the solid by setting the three radii based on a mass of the load.

7. An augmented reality system that provides augmented reality including a real robot to a user, comprising:
   a display; and
   a processor that is configured to:
      cause the display to display augmented reality including the real robot and a load connected to a robot arm of the real robot;
      define a solid having three radii extending in directions of three axes that are orthogonal to one another;
      determine a ratio of the three radii that corresponds to a ratio of values of inertia around the three axes at a centroid of the load to define an ellipsoid having diameters in three directions orthogonal to one another; and
      cause the display to display the defined ellipsoid.

8. The augmented reality system according to claim 7, wherein the processor is further configured to cause the display to display the defined ellipsoid so that a center position of the defined ellipsoid coincides with the centroid of the load.

9. The augmented reality system according to claim 7, wherein the processor is further configured to define the first solid by setting the three radii based on mass of the load.

10. The augmented reality system according to claim 7, wherein the display displays an image of the real robot acquired by a camera.

11. The augmented reality system according to claim 7, wherein the display is a transparent display that allows light to pass through the transparent display, and the user views the real robot through the transparent display.

* * * * *